United States Patent
Kunz (10) Patent No.: US 11,441,843 B2
(45) Date of Patent: Sep. 13, 2022

(54) REFRACTORY CONTAINER MADE OF A CERAMIC MATERIAL, GREEN BODY FOR SUCH A CONTAINER, AND METHOD FOR THE MANUFACTURE OF A REFRACTORY CONTAINER MADE OF A CERAMIC MATERIAL, AND OF A GREEN BODY PROVIDED FOR THIS PURPOSE

(71) Applicant: WPX Faserkeramik GmbH, Troisdorf (DE)

(72) Inventor: Mathias Kunz, Rottenburg (DE)

(73) Assignee: WPX Faserkeramik GmbH, Troisdorf (DE)

( * ) Notice: Subject to any disclaimer, the term of this patent is extended or adjusted under 35 U.S.C. 154(b) by 560 days.

(21) Appl. No.: 16/170,173

(22) Filed: Oct. 25, 2018

(65) Prior Publication Data
US 2019/0120554 A1 Apr. 25, 2019

(30) Foreign Application Priority Data

Oct. 25, 2017 (DE) .................. 10 2017 125 035.2
Nov. 23, 2017 (DE) .................. 10 2017 127 755.2
Dec. 1, 2017 (DE) .................. 10 2017 128 546.6

(51) Int. Cl.
*C04B 35/111* (2006.01)
*C04B 35/626* (2006.01)
(Continued)

(52) U.S. Cl.
CPC .......... *F27D 5/0006* (2013.01); *C04B 35/111* (2013.01); *C04B 35/62655* (2013.01); *C04B 35/62852* (2013.01); *C04B 35/62894* (2013.01); *C04B 35/64* (2013.01); *C04B 35/66* (2013.01); *C04B 35/71* (2013.01); *C04B 35/80* (2013.01);
(Continued)

(58) Field of Classification Search
CPC ......... F27D 2003/125; F27D 2003/128; F27D 2003/124; F27D 5/0012; F27D 5/0018; F27D 2001/0086; F27D 1/145; F27D 3/12; F27D 3/123; C04B 35/111; C04B 35/62655; C04B 35/62894; C04B 35/64; C04B 35/71; C04B 2235/3217; C04B 2235/5256; C04B 2235/602
See application file for complete search history.

(56) References Cited

U.S. PATENT DOCUMENTS 10,088,235 B2 10/2018 Schroeder et al.
2002/0042984 A1* 4/2002 Kumazawa ........... F27D 1/0006
361/321.1
(Continued)

FOREIGN PATENT DOCUMENTS

DE 102011080507 2/2013
DE 102016007652 12/2017
(Continued)

*Primary Examiner* — Alex B Efta (57) ABSTRACT

The invention relates to a refractory container 1 for use in a furnace for heat treatment of workpieces, comprising a mat 5 of long fibers that are embedded in a ceramic shell, with the mat 5 being shaped into a container that forms a receiving space for workpieces, and to a green body of such a container 1. Furthermore, advantageous uses of the container 1 as well as a method for manufacturing a green body or container 1 according to the invention are specified.

23 Claims, 1 Drawing Sheet

(51) Int. Cl.
*C04B 35/64* (2006.01)
*C04B 35/71* (2006.01)
*F27D 5/00* (2006.01)
*C04B 35/66* (2006.01)
*C04B 35/80* (2006.01)
*C04B 35/628* (2006.01)

(52) U.S. Cl.
CPC ............ *C04B 2235/3217* (2013.01); *C04B 2235/5224* (2013.01); *C04B 2235/5228* (2013.01); *C04B 2235/5236* (2013.01); *C04B 2235/5244* (2013.01); *C04B 2235/5248* (2013.01); *C04B 2235/5256* (2013.01); *C04B 2235/5264* (2013.01); *C04B 2235/5445* (2013.01); *C04B 2235/5481* (2013.01); *C04B 2235/602* (2013.01); *C04B 2235/616* (2013.01); *C04B 2235/9607* (2013.01)

(56) References Cited

U.S. PATENT DOCUMENTS

| | | | | |
|---|---|---|---|---|
| 2003/0054120 | A1* | 3/2003 | Nakano | H01L 21/6835 264/430 |
| 2005/0274375 | A1* | 12/2005 | Ego | B29C 70/34 126/337 R |
| 2007/0032370 | A1* | 2/2007 | Weisensel | C04B 35/573 264/682 |
| 2007/0096371 | A1* | 5/2007 | McGuigan | B28B 23/0006 264/640 |

FOREIGN PATENT DOCUMENTS

| | | |
|---|---|---|
| EP | 1098724 | 10/2005 |
| WO | WO 2017/220727 | 12/2017 |

* cited by examiner

REFRACTORY CONTAINER MADE OF A CERAMIC MATERIAL, GREEN BODY FOR SUCH A CONTAINER, AND METHOD FOR THE MANUFACTURE OF A REFRACTORY CONTAINER MADE OF A CERAMIC MATERIAL, AND OF A GREEN BODY PROVIDED FOR THIS PURPOSE

RELATED APPLICATIONS

This application claims the benefit of priority of German Patent Applications Nos. 10 2017 125 035.2 filed on Oct. 25, 2017, 10 2017 127 755.2 filed on Nov. 23, 2017, and 10 2017 128 546.6 filed Dec. 1, 2017, the contents of which are incorporated herein by reference in their entirety.

FIELD AND BACKGROUND OF THE INVENTION

The object of the present invention is a refractory container made of a ceramic material for use in a furnace for heat treatment of workpieces and a method for the manufacture thereof, a green body for manufacturing a refractory container made of a ceramic material for use in a furnace for a heat treatment of workpieces, as well as a method for manufacturing such a green body and advantageous uses of a refractory container made of a ceramic material for use in a furnace for heat treatment of workpieces.

Refractory containers of this generic type are used in the hardening industry, for example. In the hardening industry, metallic workpieces are subjected to a thermal treatment in order to set the material properties of the workpieces in a targeted and advantageous manner, for example. For this purpose, the workpieces are annealed in a hardening furnace at a temperature just below their melting temperature and then optionally flash-cooled. However, refractory containers of this generic type can also be used during sintering of metallic sintered bodies. In this process, sintered metallic workpieces are baked under the influence of heat in order to improve their mechanical properties. Here, too, the workpieces must be exposed to elevated temperatures that can approach the melting point of the metals used for the workpieces.

Various refractory containers of this generic type are known from the prior art which, for their part, consist of metallic materials such as molybdenum or high-alloy molybdenum steels. However, these are critical at high temperatures, since the metallic material of the container also softens thermally and can fail mechanically. The risk of contamination of the workpieces with alloy components of the container also exists.

Alternatively, refractory containers made of ceramic materials are used in the prior art that withstand the temperatures used in hardening or sintering metallic sintered bodies without the occurrence of a thermally induced change in the mechanical properties of the ceramic materials—that is, a thermally induced mechanical failure of such containers is observed with substantially less frequency. Moreover, ceramic materials are chemically inert, so contamination of the materials to be treated thermally is practically obviated.

If greater loads have to be accommodated, the use of containers made of ceramic composite materials, particularly of ceramic fiber-reinforced ceramics, has been well established. These are inherently known from the prior art. They are generally based on continuous ceramic fibers that are infiltrated with a slurry and subsequently fired at temperatures below the melting point of the material of the slurry, thus forming a ceramic material. This process is called sintering. During sintering, a ceramic shell is formed from the slurry that combines with the embedded ceramic fibers to form a ceramic composite material that can have very advantageous mechanical properties. These include a high resistance to brittle fracture, a very high tensile strength, and high thermal resistance even with very rapid temperature changes.

Thus far, however, no refractory containers are known that are made of ceramic composite materials and have a high mechanical load capacity with the simultaneous ability to accommodate a plurality of smaller workpieces at the same time.

SUMMARY OF THE INVENTION

It is therefore the object of the present invention to provide a refractory container made of a ceramic material for use in a furnace for heat treatment of workpieces with improved mechanical properties, a green body that is suitable for the production of such a container, a method for the manufacture of a green body as well as of a container with such improved properties, and advantageous uses of such a container.

This object is achieved by a container according to claim 1, a green body according to claim 15, a method for manufacturing a green body according to claim 18, and a use according to claim 16.

The subclaims each relate to preferred refinements or developments of the present invention whose respective features can also be freely combined with one another within the framework of what is technically sensible and, in some cases, even beyond the categorical limits of the various claims.

It should be noted that the conjunction "and/or" appearing between two features and interconnecting them is always to be interpreted in such a way that only the first feature may be present in a first embodiment of the subject invention, only the second feature may be present in a second embodiment, and both the first and the second feature may be present in a third embodiment.

Furthermore, relative terms as used herein in reference to a feature, such as the relative term "larger/greater" already used above, but also other relative terms such as "smaller," "wider," "narrower," "higher," "lower," "heavier," "lighter," "softer," "harder" and the like are to always be construed as meaning that production-related quantitative deviations of the feature in question that lie within the manufacturing tolerances defined for the respective manufacturing method of the feature in question are not included by the respective relative term. In other words, according to this definition, which applies throughout the present document, a feature quantity is to be considered to be "larger," "smaller," "wider," "narrower," "higher," "lower," "heavier," "lighter," "softer," "harder" and the like in terms of the present invention as a quantity of a comparative feature only if the two quantities being compared differ from one another in their value so much that this quantitative difference can certainly no longer be attributed to the production-related tolerance deviations of the feature in question but is the result of purposeful action.

A refractory container according to the invention is intended for use in a furnace for heat treatment of workpieces. It has a mat of long fibers that are embedded in a ceramic shell. The mat is shaped into a container that forms a receiving space for workpieces. According to the invention, the mat forms support structures and retaining structures, with the support structures having at least 50% more flexural strength than the retaining structures, preferably at least 75% more flexural strength, and especially preferably at least twice the flexural strength.

The container according to the invention is based on the insight that the mechanical properties of a container can be improved by having the container form retaining structures, on the one hand, that are designed to also hold smaller workpieces safely but that do not have the mechanical bearing capacity required to handle larger loads that may arise, for example, when a plurality of smaller parts are to be received simultaneously. In order to be able to handle such loads, the container according to the invention also forms in addition to the retaining structures, support structures that have greater flexural strength than the retaining structures.

Containers according to the invention made of ceramic composite materials have proven to be particularly useful in the hardening industry, since they can be used for fastening metallic workpieces to fire-resistant charging racks made of carbon fiber-reinforced composite materials. They form a barrier between the carbon-loaded charging racks and the workpieces to be thermally treated that prevents carburizing of the metallic workpieces to be hardened as a result of carbon emanating from the charging racks.

In a first preferred embodiment, the support structures of the mat form a grid with a first mesh size. The retaining structures of the mat form a grid with a second mesh size, with the first and the second mesh sizes being different from one another. The first mesh size is especially preferably at least twice as large as the second mesh size, preferably at least three times as large, and especially preferably at least four times as large.

In its simplest form, the mat, as a retaining structure, forms a fine-meshed grid of fiber-reinforced ceramic rods with a small cross section, whereas the support structure of the mat is embodied as a coarse mesh of fiber-reinforced ceramic rods with a larger cross section. The selection of suitable rod cross sections and mesh sizes is incumbent on the person skilled in the art who, on the basis of his specialized knowledge, will perform the measurements of the loads to be absorbed, the size of the structures to be accommodated, and the properties of the ceramic composite materials used.

Advantageously, the ceramic material of which the mat is constructed comprises a plurality of high-tensile and heat-resistant long fibers that are embedded in a ceramic matrix, which will be discussed in greater detail below. In the context of the present invention, a long fiber is to be understood as meaning a fiber whose diameter is small in relation to its length. In particular, the length of a long fiber is at least twenty times its diameter, preferably at least thirty times, and especially preferably at least four times its diameter. A long fiber can also be a bundle of individual fibers with a smaller diameter which, in turn, can be configured as multifilament fibers. Such fiber bundles are also referred to as rovings. In the following, the terms "long fiber" and "fiber" are used synonymously in the context of the present invention.

In a first advantageous embodiment of the invention, the long fibers comprise, particularly consist of, a ceramic material. In particular, the ceramic material can be an oxide ceramic material. It is especially preferably a metal oxide ceramic material.

In a second advantageous embodiment of the invention, the long fibers comprise carbon fibers; in particular, the long fibers are embodied as carbon fibers.

In a preferred embodiment, all of the long fibers in the individual elements of both the retaining structure and the support structure extend substantially in at least one main fiber direction R. The main fiber direction R preferably coincides with the longitudinal axis of the individual elements of both the retaining structure and the support structure, which is given by the direction of the greatest extent of these elements, or by the direction in which the greatest tensile stress occurs when the container is used as intended. If the individual elements forming the retaining and/or support structure are rod-shaped, then the long fibers preferably extend in the direction of the respective rod longitudinal axis.

As mentioned previously, in another preferred development of the container according to the invention, the long fibers each comprise a multiplicity of fibers of smaller diameter that are combined to form a bundle in which the individual fibers extend substantially along the bundle longitudinal axis.

Each individual fiber can, in turn, be embodied as a multifilament fiber in which the individual filaments extend substantially along the bundle longitudinal axis.

Such fiber bundles consisting of a plurality of multifilament fibers are also referred to as rovings.

In particular, a roving can be a direct roving that can be obtained through the parallel combination of the multifilament fibers into a bundle. In principle, however, it is also conceivable for an assembled roving to be formed that is obtained from a predefined number of equally tensioned direct rovings by means of compartments. Moreover, a roving can be made by twisting multifilament fibers that are being used. In principle, twisted yarns as well as multifold yarns are possible.

Long fibers or fiber bundles and, in particular, rovings have proven to be especially useful in the context of the present invention if the fibers contained comprise or preferably consist of a ceramic material such as $Al_2O_3$ or a mixture of $Al_2O_3$ and mullite, for example. Corresponding rovings are offered, for example, by the company 3M under the name Nextel® in the form of wound continuous material.

In a preferred embodiment, the individual filaments of a multifilament fiber contained in a long fiber have a diameter of greater than 3 micrometers, preferably greater than 5 micrometers, and especially preferably greater than 7 micrometers. In particular, all filaments contained can have the same diameter, but they can also have a plurality of different diameters.

Special advantages with respect to the infiltrability of a long fiber formed as a bundle of multifilament fibers are achieved if multifilament fibers in the bundle are not intertwined or twisted together. Regarding the infiltrability of rovings and advantageous methods for especially homogeneous infiltration, reference is made to the disclosure of DE 10 2014 115 414, which is hereby incorporated into the subject matter of the present application by reference.

In a first advantageous embodiment, the long fibers comprise $Al_2O_3$, with the weight proportion of $Al_2O_3$ in the long fiber being greater than 70%, preferably greater than 80% and especially preferably greater than 99%.

In an advantageous development of the aforementioned embodiment, the long fibers further comprise mullite, with the weight proportion of mullite in the long fiber being preferably between 10% and 20%.

In an advantageous development of the aforementioned embodiment, the long fibers further comprise $ZrO_2$, with the weight proportion of $ZrO_2$ in the long fiber being preferably 5% or more.

In an advantageous development of the aforementioned embodiment, the long fibers further comprise SiC, with the weight proportion of SiC in the long fiber being preferably 5% or more.

The use of oxide-ceramic multifilament fibers from the manufacturer 3M, which are sold under the trade names Nextel™ 312 (main constituents: $Al_2O_3$, boron oxide, $SiO_2$), 440 (main constituent: aluminum silicate), 550 (main constituents: gamma-aluminum oxide, $SiO_2$) 610 and 720. Reference is made in this regard to the *Ceramic Textiles Technical Notebook*, which is offered as a download by the 3M Company at the link http://solutions.3mdeutschland.de/wps/portal/3M/de DE/EU-EAMD/Home/OurProducts/NextelCeramicTextiles/. The preferred Nextel 610 fiber has a weight proportion of $Al_2O_3$ of greater than 99%, and the preferred mullitic fiber Nextel™ 720 contains about 85% by weight of $Al_2O_3$ and 15% by weight of $SiO_2$. Also, the fiber that is sold under the trademark Cerafib 99 Corundum and substantially comprises $Al_2O_3$ has proven itself in the context of the present invention. Other noteworthy mullitic fibers are the commercially available products that are sold under the trademarks Cerafib 75 Mullite and Nitivy ALF. Finally, SiC-based fibers can also be advantageously used in the context of the present invention.

As regards the ceramic matrix in which the long fibers of the container according to the invention are embedded, it has proven advantageous if the ceramic matrix comprises an oxide ceramic material.

One preferred oxide ceramic material is $Al_2O_3$. It has proven to be particularly advantageous if the weight proportion of $Al_2O_3$ in the matrix is greater than 70%, preferably greater than 80%, and especially preferably greater than 99%.

In another preferred embodiment of the invention, the ceramic matrix further comprises mullite. The weight proportion of mullite in the matrix is preferably between 10% and 20%.

In principle, $Al_2O_3$ with a zirconium oxide dopant or even zirconium oxide itself can also be advantageously used for the matrix of the container in the context of the present invention. Thus, in a preferred embodiment, the ceramic matrix of a container according to the invention comprises $ZrO_2$, with the weight proportion of $ZrO_2$ in the matrix being greater than 5%.

Furthermore, $Al_2O_3$ with an SiC dopant or SiC itself can also be advantageously used for the matrix of the container in the context of the present invention. Thus, in a preferred embodiment, the ceramic matrix of a container according to the invention comprises SiC, with the weight proportion of SiC in the matrix being greater than 5%.

As can be seen from the above non-exhaustive enumeration of the composition of both the long fibers and of the matrix, the use of non-oxide materials such as SiC for long fiber and/or matrix is advantageous in individual cases. For the sake of simplicity, these fiber composite materials are referred to in the context of the present invention as "oxide ceramic." In principle, however, in the context of the present invention, at least the long fiber or the matrix preferably comprises an oxide material, especially preferably both the long fiber and the matrix.

Special advantages in terms of the tensile and breaking strength of the container according to the invention are achieved if, based on the weight of the container, the proportion of long fibers in the fiber composite is at least 10%, preferably at least 20%, and especially preferably at least 30%. The specified proportion of the multifilament fiber refers particularly to the abovementioned preferred embodiments with $Al_2O_3$ in the long fiber or in the matrix or in both, with reference being made again to the respectively specified weight proportions.

In addition, special advantages in terms of breaking strength are achieved if the porosity of the matrix in the finished container is set to between 20 and 60% by volume, particularly between 20 and 40%. A corresponding porosity can be achieved using the method according to the invention, particularly if the matrix comprises $Al_2O_3$ in the specified weight range.

Special advantages in terms of the breaking strength of a container according to the invention are achieved if the particle size distribution of the sintered fine-grained material, which can be a metal oxide, for example, is monomodal or bimodal in the matrix of the container. It has proven to be particularly advantageous if the particle size distribution of the fine-grained sintered material in the container has at least a maximum that is correlated with a first particle size fraction and that is advantageously between 100 and 500 nanometers.

Moreover, it has proven advantageous if the grain size distribution of the fine-grained sintered material in the container also has a second maximum that is correlated with a second particle size and advantageously lies above 5000 nanometers and especially preferably above 10000 nanometers.

In another preferred embodiment, the first and second particle size fractions, independently of one another, each make up at least 10% by volume of the ceramic fraction of the ready-to-use container. In this embodiment, it has also proven to be especially advantageous if the particle size fraction with the larger mean particle size weighted by volume fraction makes up a smaller volume fraction in the ready-to-use container than the particle size fraction with the smaller mean particle size. This results in components with an especially high resistance to brittle fracture.

It was also found that the containers according to the invention have especially advantageous mechanical properties if the fiber content in the container is in a range from 15 to 40% by volume, particularly from 20 to 30% by volume, and especially preferably at about 25% by volume. This is especially true if fibers with a high $Al_2O_3$ content are used, and very especially if the $Al_2O_3$ content in the fibers is greater than 99% by weight.

In a first preferred development, the container according to the invention has a plurality of openings through which fluid can flow. The provision of such openings is advantageous because, in hardening processes, purge gases/fluids are used that flow around the workpieces to be hardened in a hot furnace.

In a second preferred development, however, the container according to the invention does not have any openings through which fluid can flow. In particular, the container according to the invention can be substantially fluid-tight. To achieve this, the retaining structure in particular can consist of a densely packed layer—that is, the long fibers are placed close together in this position, so that when the green body produced in this way is sintered, a continuous surface is formed that can exhibit good fluid-tightness.

It can be advantageous to dispense with openings in the container according to the invention if, in addition to containers according to the invention, carbon-loaded holding devices such as charging racks are used in the furnace that pose the risk of carbon contamination of the workpieces to be thermally treated.

The elements that form the support structure and the elements that form the retaining structure can be rod-shaped, for example. These rod-shaped elements can also have a substantially rectangular or even round cross section.

Different flexural strengths of the elements forming the support structure and of the elements forming the retaining structure can be achieved in various ways.

In a first approach, a first number of fibers, e.g., ceramic fibers, are embedded in the cross section of the elements forming the support structures, and a second number of fibers, e.g., ceramic fibers, are embedded in the cross section of the elements forming the retaining structures. The first number is preferably at least 50% higher, preferably at least 75% higher, particularly at least 100% higher than the second number.

In a second approach, a first type of fiber—which can be a ceramic fiber, for example—is embedded in the cross section of the elements that form the support structures. In contrast, a second type of fiber—which can, in turn, be a ceramic fiber, for example—is embedded in the cross section of the elements forming the retaining structures, with the tensile strength of the first type of fiber being at least 20% greater, preferably at least 30% greater, particularly at least 40% greater than the tensile strength of the second type.

In a third approach, a first type of fiber—which can be a ceramic fiber, for example—is embedded in the cross section of the elements that form the support structures. In contrast, a second type of fiber—which can, in turn, be a ceramic fiber, for example—is embedded in the cross section of the elements forming the support structures, with the fiber weight of the first type of fiber being greater than the fiber weight of the second type of fiber.

Preferably, the fiber weight of the first type of fiber is at least twice as great, preferably at least three times as great, and especially preferably at least four times as great as the fiber weight of the second type of fiber. Accordingly, it has proven to be effective if the first type of fiber has a fiber weight of about 12,000 denier and the second type of fiber has a fiber weight of about 3,000 denier. These are advantageously fibers of $Al_2O_3$. The embodiment according to the third approach has proven to be advantageous, because the use of fibers with a high fiber weight for the support structures, which of course have a larger cross section than the retaining structures, allows the support structures to be produced substantially faster as scrim. A higher fiber weight is usually associated with a larger fiber cross section, so that fewer fibers (and thus fewer turns in a scrim that is produced as a yarn package) are required in order to achieve a predetermined cross section of the support structure. In this way, the manufacture of the support structures can be accelerated. What is more, relevant cost advantages are also achieved, since a shorter length of ceramic fibers is needed in order to achieve the predetermined cross section of the support structures. The material costs of the ceramic fibers are an essential factor in the manufacturing costs of a refractory container. Moreover, a positive impact can be observed not only due to the reduced length requirement, but also due to the substantially lower market price of ceramic fibers with a greater fiber weight in particular.

In a fourth approach, the ceramic shell of the fibers that are embedded in the elements forming the support structures—which can be ceramic fibers, for example—has different mechanical properties than the ceramic shell of the fibers that are embedded in the elements forming the retaining structures. Here, again, these can be ceramic fibers, for example. This can be achieved by means of different materials in the shell, for example, or by means of different size distributions of the materials used in the shell, or by a combination of both.

All of the technical approaches discussed above for realizing different flexural load capacities of the elements forming the retaining and support structures can be easily combined with each other.

In a preferred embodiment of a container according to the invention, the mat forms at least one kink-free surface, which can be the bottom surface of a tray, for example. In this preferred embodiment, the elements forming support structures extend in this area in two preferably crossed main directions A and A' and thus form—if the main directions A and A' are crossed—a rectangular or, optionally, also an oblique grid. In contrast, the elements forming the retaining structures extend in this area in two main directions B and B', which are optionally crossed. These elements can thus also form a rectangular or, optionally, also an oblique grid. These two grids are superimposed in this preferred embodiment, with it being possible for the main directions A and B or A' and B' to coincide or be different.

It is also conceivable for the elements forming the supporting structure to be aligned parallel to one another—that is, the main directions A and A' coincide in this embodiment. Alternatively or in parallel, it is also conceivable for the main directions B and B' of the elements forming the retaining structure to coincide. This is less preferred, however.

In a preferred embodiment of the container according to the invention, the mat is embodied as a scrim of long fibers. In particular, the elements of the mat forming the support structures and/or retaining structures are embodied as scrim.

Scrims can be produced directly in the process of manufacturing a container according to the invention, which will be discussed in more detail below. Moreover, they offer advantages in the manufacturing method itself, since they can be made of long fibers that can already be infiltrated with a slurry that suitable for forming a ceramic matrix, such as a water-based metal oxide, for example. The fiber-reinforced composite ceramic components obtained after sintering of the dried scrim have superior material properties, since material defects resulting from insufficient infiltration of long fibers can be excluded with a very high level of reliability.

A scrim can be obtained, for example, by winding a long fiber by means of an advantageously automated winding station on a rotating, e.g., cylindrical, package. This can be done before or advantageously after infiltration of the long fiber with the slurry. Two mutually inclined fiber directions can also be produced by advancing the fiber constantly both in the direction of the axis of rotation of the package during winding and counter to this direction. Different feed rates in the different directions or different rotational speeds of the package in the two feed directions result in different angles of inclination of the fiber orientation.

Once the desired material thickness of the fabric has been achieved and, in particular, the precursors of the support structures and the precursors of the retaining structures have been sufficiently formed, the winding is stopped and the hollow cylinder wound onto the package is preferably cut parallel to the axis of rotation of the package and placed on a surface having the desired geometry, e.g., a flat surface. A mat-shaped, preferably already infiltrated scrim is obtained which can be further processed in the context of the first method according to the invention described below.

In an alternative preferred embodiment of a container according to the invention, the long fibers in the mat are spun into a yarn. This embodiment also makes it possible to produce the yarn on site from long fibers that have optionally already been infiltrated with a slurry and to use them subsequently to produce a scrim.

The formation of the mat with integrally formed precursors of the support and retaining structures as scrim has proven to be especially advantageous, because the properties of support and retaining structures can be set directly in the simplest of manners during the manufacture of a mat as scrim in a winding process.

In an alternative preferred embodiment, the long fibers in the container according to the invention form a woven, warp-knit, or otherwise knitted fabric.

Woven, warp-knit, and otherwise knitted fabrics can be produced excellently on a large scale by machine, whereby defects in the woven, warp-knit, and otherwise knitted fabrics can be largely eliminated. Moreover, through the appropriate selection of long fibers—in terms of their diameter or internal structure, for example—and by setting suitable parameters of the woven, warp-knit, or otherwise knitted fabric, the material properties of the woven, warp-knit, or otherwise knitted fabric used set within wide limits and adapted to the required mechanical properties of the container to be produced.

According to the invention, the scrim or the woven fabric, warp-knit fabric, or otherwise knitted fabric is mat-shaped. In particular, such a mat can have a thickness of from less than one millimeter to several dozen millimeters. Preferably, the thickness of such a mat is a few millimeters. The thickness of the mat can vary locally, however. In particular, it can have a greater thickness in the vicinity of the precursors of the support structures than in the vicinity of the precursors of the retaining structures.

The mat of a container according to the invention forms an edge. In another advantageous development of the container according to the invention, the container forms a collar that mechanically reinforces the edge of the mat. In particular, such a collar can form a mechanically stiffening framework for the receiving space formed by the mat.

Such a collar can be made of a fiber-reinforced ceramic material, for example. It can thus comprise a plurality of long fibers—e.g., long ceramic fibers—that are embedded in a ceramic shell. The fibers in the collar are advantageously oriented substantially along the edge of the mat. Especially preferably, the long fibers form a scrim in the collar as well. This makes it especially simple to manufacture such a collar, particularly in the context of the production of the mat as a scrim or thereafter.

A green body according to the invention is provided for the manufacture of a refractory container according to the invention through sintering. Such a green body has at least one mat of long fibers that is infiltrated with a ceramic slurry and has precursor structures which, after sintering of the green body, form the support structures and retaining structures of a container according to the invention.

The precursors of the support and retaining structures can be formed as follows, for example:

i. The long fibers forming the precursors of the support structures are infiltrated with a first slurry, and the long fibers forming the precursors of the retaining structures are infiltrated with a second slurry, with the first and second slurries being different from each other;

ii. a first number of long fibers are embedded in the cross section of the precursors of the support structures, and a second number of long fibers are embedded in the cross section of the precursors of the retaining structures, with the first number being at least 50% greater, preferably at least 75% greater, particularly at least 100% greater than the second number; or iii. a first type of long fiber is embedded in the cross section of the precursors of the support structures, and a second type of long fiber is embedded in the cross section of the precursors of the retaining structures, with the tensile strength of the first type of long fiber being at least 20% greater, preferably at least 30% greater, particularly at least 40% greater than the tensile strength of the second type.

The sintering of such precursor structures leads to the formation of retaining and support structures in the mat of the container having the desired properties according to the invention.

With regard to additional features and advantages of other developments of the green body according to the invention, reference is made to the method discussed below for the manufacture of such a green body as well as to the features and advantages of the various embodiments and developments of the container according to the invention. These can be used directly for the development of the green body according to the invention insofar as they are applicable to a green body.

A first method according to the invention is provided for manufacturing a green body from which a refractory container for use in a furnace for heat treatment of workpieces can be obtained by means of sintering. The mat of the container according to the invention obtained through the sintering of the green body forms supporting structures and retaining structures according to the invention.

The method comprises the following method steps, which need not necessarily be carried out in the order in which they are mentioned, although they are preferably carried out in this order:

a) infiltration of long fibers with a slurry that is suitable for forming a ceramic shell by sintering, b) formation of a mat of long fibers, with the mat forming precursors of the support structures and precursors of the retaining structures.

It should be noted that, in addition to the abovementioned method sequence, in which the long fibers are first infiltrated with a slurry and then processed into a mat, it is also possible to create the mat from non-infiltrated long fibers and to infiltrate the resulting mat with a slurry in a subsequent method step. Therefore, in an alternative embodiment of the first method according to the invention, the method comprises the method step of infiltrating the two-dimensionally extended scrim or woven, warp-knit, or otherwise knitted fabric of long fibers with the slurry.

It is also noted that an intermediate step can be carried out between the formation of the precursors of the support structures and the formation of the precursors of the support structures (or vice versa) in which an at least partial drying of the mat created up to that point in time takes place.

The following method steps are subsequently carried out:

c) shaping of the mat of infiltrated long fibers into a container forming a receiving space for workpieces, and d) drying of the shaped mat.

The manufacture of the precursors of the support structures preferably differs from the manufacture of the precursors of the retaining structures in at least one of the following method steps or features:
  i. The long fibers forming the precursors of the support structures are infiltrated with a first slurry, and the long fibers forming the precursors of the retaining structures are infiltrated with a second slurry, with the first and second slurries being different from each other;
  ii. a first number of long fibers are embedded in the cross section of the precursors of the support structures, and a second number of long fibers are embedded in the cross section of the precursors of the retaining structures, with the first number being at least 50% greater, preferably at least 75% greater, particularly at least 100% greater than the second number; or
  iii. a first type of long fiber is embedded in the cross section of the precursors of the support structures, and a second type of long fiber is embedded in the cross section of the precursors of the retaining structures, with the tensile strength of the first type of long fiber being at least 20% greater, preferably at least 30% greater, particularly at least 40% greater than the tensile strength of the second type.

In another advantageous embodiment of the first method according to the invention, the method comprises the additional method step of mechanically supporting the shaped mat during drying. In this way, it can be ensured that the shaping performed during the process is not altered during drying as a result of stress-induced relaxation of the long fibers.

Additional advantageous embodiments of the first method according to the invention relate to the slurry used to infiltrate the long fibers or the structures comprising the long fibers, such as scrims, woven fabrics, warp-knit fabrics, or otherwise knitted fabrics.

In a first advantageous embodiment, the fine-grained sinterable material contained in the slurry—which can be a metal oxide, for example—shows at least two mutually different particle size fractions of different maxima in the particle size distribution. Weighted by volume fraction, the first particle size fraction has a mean particle size of up to 1000 nanometers, and at least one second particle size fraction has a mean particle size of at least 5 micrometers.

In a preferred development of this method, the first particle size fraction has a mean particle size of up to 0.5 micrometers.

In another preferred development, the second particle size fraction has a mean particle size of at least 10 micrometers.

It was found that the containers manufactured by means of the method according to the invention have especially advantageous mechanical properties if the fiber content in the ready-to-use container or green body is in a range from 15 to 40% by volume, particularly from 20 to 30% by volume, and especially preferably at about 25% by volume.

Advantageously, the mat of long fibers is created such that, in the raw state, but at least after the shaping thereof into the container, it forms a plurality of openings through which fluid can flow.

It has proven advantageous if the mat is manufactured such that the precursors of the support structures form a grid with a first mesh size and the precursors of the retaining structures form a grid with a second mesh size, with the first and the second mesh sizes being different.

In an advantageous embodiment of the first method, the precursors of the retaining structures are formed substantially completely in one method step, and the precursors of the support structures are formed substantially completely in a separate method step. In this case, either the support structures or the retaining structures can be formed first.

In an advantageous development of this embodiment of the first method, a drying step is carried out between the method steps for forming the precursors of the support structures and the precursors of the retaining structures in which at least partial drying of the slurry takes place in the infiltrated precursor of the support or retaining structures that have already been produced.

In order to shape the mat of infiltrated long fibers into a container forming a receiving space for workpieces, one of the following process steps is advantageously carried out:
a. winding of the long fibers onto a yarn package,
b. placement of a mat of infiltrated long fibers onto a mold body.

In the case of the variant of the method according to step a., the mat is already shaped during its manufacture such that it immediately has a shape in which it—optionally after a certain post-processing, especially when the green body in the dried state—forms a receiving space for workpieces.

In a development of this variant of the method, the mat formed on the yarn package is divided into at least two parts that preferably have substantially the same shape. In this case, it may be advantageous to divide it into sections only after at least partial drying of the infiltrated scrim on the yarn package in order to form green bodies (two, for example) for a plurality of containers according to the invention.

In a preferred development of this variant of the method, a cuboid is used as the yarn package. Especially preferably, this is rotated about one of its space diagonals during the winding of the long fibers on its surface.

In an alternative preferred development of this variant of the method, an ellipsoid is used as the yarn package that is rotated about its axis of symmetry during the winding of the long fibers.

During the winding of the long fibers on the surface of the yarn package, it can be advantageous if, depending on its, the yarn package
  i. is rotated about more than one axis of rotation, or
  ii. performs a linear movement in at least one spatial direction, or
  iii. the axis of rotation of the yarn package performs a movement in space. Combinations of the abovementioned movements of the yarn package are also possible on suitable machine tools.

In the case of a variant of the method according to lit. b., a mat of long fibers is produced that is preferably already infiltrated and can have any desired shape. This can be obtained, for example, by winding the long fibers onto a cylindrical yarn package, for example, in which case the tubular/cylindrical scrim obtained in this way is cut along a cutting line so that the mat can be removed from the circumference of the cylindrical yarn package.

The resulting mat, which can still be deformed within wide limits before it is (slightly) dried, is then placed on a mold body that represents a negative mold for the receiving space of the container to be formed.

It is also possible for such a mold body to form a negative mold for a plurality of receiving spaces.

The mat formed in the context of the method according to the invention always forms an edge. In a preferred development of the method, a collar is integrally formed on the edge of the shaped mat in an additional method step.

In a preferred embodiment of the method for forming the collar, the collar is integrally formed on the mat by winding a long fiber that is infiltrated with a slurry that is suitable for forming a ceramic shell multiple times around the shaped mat along its (future) edge, with the mat already forming a receiving space for one or more workpieces. Winding can be performed around future edge if the green body of the container still needs to be cut out of the shaped mat.

It has proven advantageous if the shaped mat is rotated about at least one axis whether or not it has already been isolated. In this way, the collar can be easily produced as a multi-layered scrim, for example, from a long fiber that is infiltrated with a slurry.

Preferably, the collar is formed prior to the drying of the infiltrated mat or after partial drying of the infiltrated mat.

In an alternative variant of the method, the collar is formed only after the drying of the infiltrated mat.

The molding of the collar on the edge of the shaped infiltrated mat is usually performed before the sintering of the infiltrated mat. In individual cases, however, it can also be advantageous to mold the collar only after the sintering of the infiltrated mat.

A method according to the invention for manufacturing a refractory container for use in a furnace for heat treatment of workpieces comprises at least the following method steps:
 a) manufacturing a green body according to an embodiment of the method according to the invention disclosed above for manufacturing a suitable green body, and
 b) sintering of the green body.

BRIEF DESCRIPTION OF THE SEVERAL VIEWS OF THE DRAWINGS

It should be noted that the features of the specified developments and advantageous embodiments as well as of the appended claims can be freely combined within the scope of what is technically possible even if this is not explicitly stated in the text. This also applies particularly beyond the limits of the claim categories of device and method.

Additional advantages and features of the green body and container according to the invention, of the use thereof, and of the manufacturing method according to the invention follow from the following exemplary embodiments, which are explained in greater detail with reference to the drawing.

DESCRIPTION OF SPECIFIC EMBODIMENTS OF THE INVENTION

For the exemplary embodiment of the method according to the invention, a slurry is prepared on the basis of a high-purity micronized aluminum oxide, with the proportion of $Al_2O_3$ with respect to the total weight of the micronized aluminum oxide being about 99.8% by weight. The proportion of $\alpha$-$Al_2O_3$ is at least 95%. The particle size distribution of the micronized aluminum oxide is monomodal and can be characterized by d10=0.1 to 0.4 micrometers, d50=0.5 to 0.8 micrometers, and d90=1.5 to 3 micrometers. The particle size distribution has a maximum between 0.1 and 0.4 micrometers.

The slurry is prepared from the aforementioned micronized aluminum oxide, water, and a carboxylic acid-based plasticizer, with the weight proportion of aluminum oxide in the slurry being about 80%. Furthermore, the carboxylic acid-based plasticizer is added in aqueous form in a weight proportion of about 2 to 3%. Water is added as the remaining component. All three components are intermixed thoroughly until a highly viscous suspension is obtained. Milling during mixing is not required.

A plurality of Nextel™ 610-type continuous multifilament fibers (3,000 denier, 10,000 denier, or 20,000 denier fiber weight) are unwound from supply packages by means of an unwinding device and assembled into a roving.

The roving obtained in this way is fed to a slurry bath, to which a sufficient quantity of the aforedescribed slurry is also fed at the same time. As the roving passes through the slurry bath, it is infiltrated, resulting in an intensive penetration of the roving with the slurry that also extends particularly to the region between the fibers of the roving consisting of a bundle of multifilament fibers. Additional deflections of the roving in the sludge bath over cylinders with a smooth surface ensure complete infiltration.

The infiltrated roving is then passed through a plurality of successive mechanical apertures. The minimum cross section of the apertures used is selected such that it is greater than the minimum cross section of the rovings that is obtained with an optimum volume ratio of the multifilament fibers.

After passing through the plurality of mechanical apertures, the infiltrated roving is fed to a CNC-controlled winding station, in which the infiltrated roving is automatically wound onto a cylindrical yarn package. By controlling the rotational movement, the angle between the axis of rotation of the yarn package and the direction of movement of the roving being supplied, and a translational movement of the yarn package on a plane perpendicular to the direction of movement of the roving, complex winding patterns can be produced on the surface of the yarn package by means of the CNC-controlled winding machine. In a first step, the infiltrated roving is wound onto the lateral surface of the yarn package in such a way that a first rectangular grid with a first mesh width is obtained that is in the range of approximately 2 to 15 millimeters, preferably 10 millimeters. The width of the webs 3 of the grid is in the range of 2 millimeters, and the cross section of the webs 3 is in the range of 4 square millimeters.

In a second step, the infiltrated roving is wound onto the lateral surface of the first grid formed on the lateral surface of the yarn package, resulting in a second rectangular grid with a second mesh size that is in the range of about 10 to 70 millimeters, preferably 40 millimeters. The width of the webs 4 of the grid is in the range of 5 millimeters, and the cross section of the webs is in the range of 20 square millimeters.

The infiltrated roving is wound onto the yarn package such that the first grid and the second grid are inclined relative to each other, meaning that the main directions A and B and A' and B' of the first and second grid are inclined toward one another.

The different widths and cross-sectional areas of the webs 3, 4 of the first and the second grid are determined by different numbers of rovings wound next to one another and over one another on the circumference of the cylinder.

The shape of the cross-sectional areas of the webs of both the first and the second grid is approximately rectangular.

The webs 3 of the first grid form the precursors of the retaining structures.

The webs 4 of the second grid form the precursors of the support structures.

Figure 1:
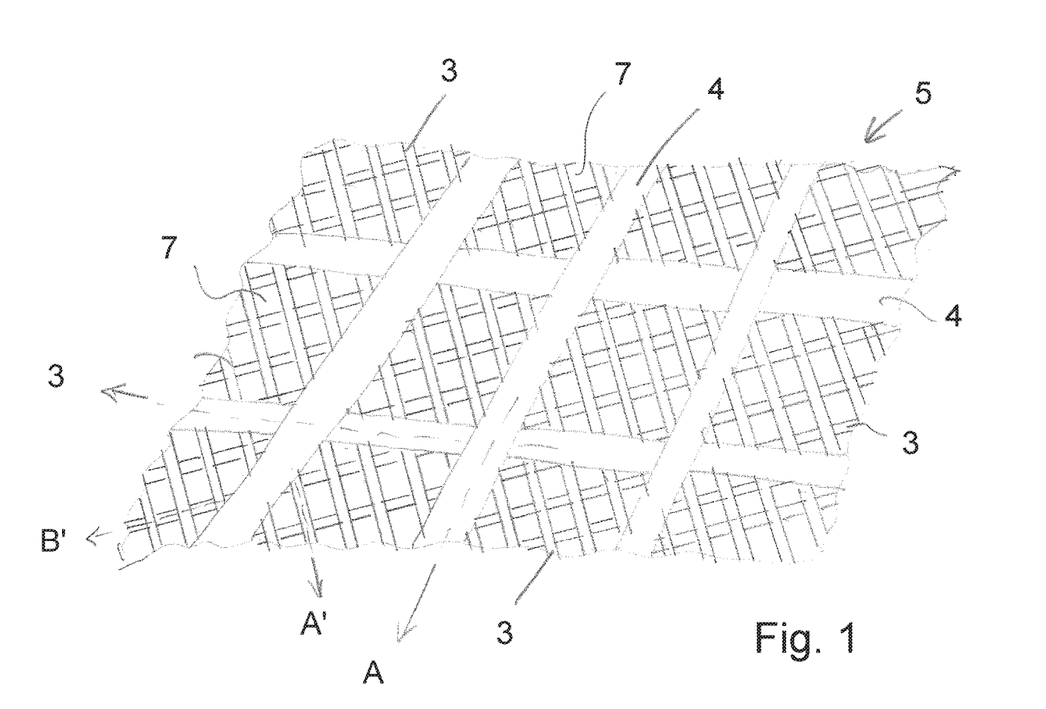
FIG. 1 shows a top view of an enlarged cutout of a mat that is embodied as a scrim for forming a green body according to the invention.

FIG. 1 shows a top view of the position of the second grid on a mat 5 produced in this way. In the ready-to-use container 1, the retaining structures form a support for the workpieces to be received by the container 1, and the support structures lie on the side of the retaining structures facing away from the support.

If a scrim of sufficient strength is completed in which the precursor structures are formed as required, so that the scrim constitutes a mat in the sense of the present invention, then this is separated from the continuous roving and cut open along a line of intersection that runs parallel to the axis of symmetry of the yarn package, so that the infiltrated scrim that is wound onto the yarn package can be removed from same and placed on a flat surface for further processing, for example.

Due to its grid structure, the mat 5 made in this way from long fibers thus forms a plurality of openings 7 through which fluid can pass, as can be seen from FIG. 1.

The resulting mat 5, which can still be deformed within wide limits before it is (slightly) dried, is then placed on a mold body that represents a negative mold for the receiving space of the container to be formed. Such a mold body can be a cuboid with two square upper surfaces, for example, with the mat 5 being deposited on one of these upper surfaces. The still shapeable mat 5 is then molded on the four side surfaces of the cuboid.

Any supernatant of the still wet mat 5 is then removed.

Such a supernatant can be minimized by properly cutting the mat 5 removed from the surface of the yarn package before depositing it on the mold body.

In an additional method step, a collar 6 is formed on the edge of the shaped mat 5 while the shaped mat 5 is still on the mold body. This collar 6 is formed prior to the drying of the infiltrated shaped mat 5.

To do this, the long fiber already used to form the mat 5 and infiltrated with the same slurry is wound several times around the shaped mat 5 on the mold body along its edge, which mat 5 already forms a receiving space for one or more workpieces. The mold body with the shaped mat 5 on it is repeatedly rotated for this purpose about at least one axis perpendicular to the square upper surface of the mold body. A collar 6 is thus produced in the form of a multilayer scrim from the long fiber that is infiltrated with the slurry.

The mat 5 that is located on the mold body and has been provided in this way with a collar 6 on its edge then undergoes a drying step. The drying can be carried out in ambient conditions, but it can also be accelerated through the use of microwaves or infrared radiation, the supplying of heat, or through removal of atmospheric moisture from the ambient air.

If a green body 2 according to the invention formed three-dimensionally in this manner in the form of a tray for a container 1 according to the invention is sufficiently dried as to have sufficient mechanical stability, the resulting three-dimensionally shaped, inherently stable green body 2 can be fed to a suitable sintering device. This can be a chamber furnace, for example, in which the green body 2 is sintered at a temperature of about 1200° C. for about one hour.

The resulting container 1 is removed from the sintering device and, after sufficient cooling—which, in turn, can be accelerated in a cooling station—can be provided for its intended use, for example as a sintered basket for receiving a plurality of metallic sintered bodies that are to be thermally treated.

Figure 2:
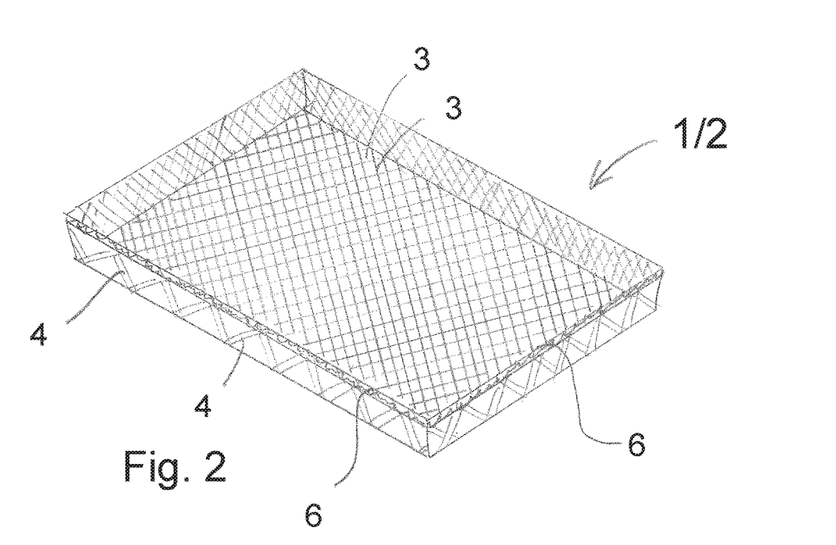
FIG. 2 shows a perspective view of an inventive green body or container according to a first exemplary embodiment.

FIG. 2 shows such a container 1 shaped as a tray or the preceding green body 1, with supporting structures or retaining structures formed being indicated only schematically by their associated webs 3 and 4. The retaining structures form the support surface for the workpieces, whereas the support structures lie on the outer surfaces of the container.

In a second exemplary embodiment, after infiltration with the aforedescribed slurry, the continuous long fiber described above is wound onto a cuboid yarn package that is rotated about one of its space diagonals for this purpose. The infiltrated long fiber is guided such that the two grids are formed which are superimposed and inclined toward one another and have different mesh sizes and web widths/cross sections according to the first embodiment.

In the case of the variant of the method according to lit. a., the mat is already shaped during its manufacture such that it immediately has a shape in which it—optionally after a certain post-processing, especially when the green body in the dried state—forms a receiving space for workpieces.

In this variant of the method, the mat formed on the yarn package is divided after at least partial drying into two parts having substantially the same shape, so that two green bodies according to the invention are simultaneously obtained for two containers according to the invention which, in turn, can be shaped like a tray.

In a third exemplary embodiment, an ellipsoid is used as the yarn package in an otherwise identical variant of the method and is rotated about its axis of symmetry during the winding of the long fibers. After at least partial drying, the resulting mat is broken down into two identically shaped green bodies, preferably by means of a cut that is guided on a plane that is parallel to the axis of symmetry of the ellipsoid or on a plane along which the axis of symmetry of the ellipsoid extends. In this exemplary embodiment, two identically shaped cup-shaped green bodies or containers can be obtained.

What is claimed is:

1. A refractory container (1) for use in a furnace for heat treatment of workpieces, comprising a mat (5) of long fibers that are embedded in a ceramic shell, with the mat (5) being shaped into a container forming a receiving space for workpieces, characterized in that the mat (5) forms support structures and retaining structures, with the support structures having at least 50% greater flexural strength than the retaining structures, wherein the ceramic shell comprises an oxide ceramic material.

2. The container (1) as set forth in claim 1, characterized in that the container (1) forms a plurality of openings (7) through which fluid can pass.

3. The container (1) as set forth in claim 1, characterized in that the support structures form a grid with a first mesh size and the retaining structures form a grid with a second mesh size, with the first and the second mesh sizes being different from one another.

4. The container (1) as set forth in claim 3, characterized in that the first mesh size is at least twice as large as the second mesh size.

5. The container (1) as set forth in claim 1, characterized in that a first number of long fibers are embedded in a cross section of the support structures, and a second number of long fibers are embedded in a cross section of the retaining structures, with the first number being at least 50% greater.

6. The container (1) as set forth in claim 1, characterized in that a first type of long fiber is embedded in a cross section of the support structures, and a second type of long fiber is embedded in a cross section of the retaining structures, with the tensile strength of the first type of long fiber being at least 20% greater.

7. The container (1) as set forth in claim 1, characterized in that a first type of long fiber is embedded in a cross section of the support structures, and a second type of long fiber is embedded in a cross section of the retaining structures, with the fiber weight of the first type of fiber being greater than the fiber weight of the second type of fiber.

8. The container (1) as set forth in claim 1, characterized in that the shell of the long fibers embedded in the support structures has different mechanical properties than the shell of the long fibers embedded in the retaining structures.

9. The container (1) as set forth in claim 1, characterized in that the mat (5) forms at least one kink-free surface, with the support structures in this area extending in two crossed main directions A and A' and the retaining structures in this area extending in two main directions B and B'.

10. The container (1) as set forth in claim 9, characterized in that the main directions A and B as well as A' and B' coincide or are different.

11. The container (1) as set forth in claim 1, characterized in that the mat (5) is embodied as a scrim of long fibers.

12. The container (1) as set forth in claim 1, wherein the mat (5) forms an edge, characterized in that the container (1) forms a collar (6) that mechanically reinforces the edge.

13. The container (1) as set forth in claim 12, characterized in that the collar (6) comprises a plurality of long fibers that are embedded in a ceramic shell.

14. The container (1) as set forth in claim 13, characterized in that the fibers in the collar are oriented substantially along the edge of the mat (5).

15. The container (1) as set forth in claim 13, characterized in that the long fibers in the collar (7) form a scrim.

16. A green body (2) for a refractory container (1) as set forth in claim 1, comprising a mat (5) of long fibers that is infiltrated with a ceramic slurry.

17. A method for using a container (1) as set forth in claim 1, characterized in that the container (1) is used in a sintering furnace or in a hardening furnace.

18. The method as set forth in claim 17, characterized in that the container (1) receives one or more metallic workpieces.

19. A method for manufacturing a refractory container (1) for use in a furnace for heat treatment of workpieces, comprising the following method steps:
 a. manufacturing of a green body (2) as set forth in the method of claim 18, and
 b. sintering of the green body (2).

20. The container (1) as set forth in claim 1, wherein the oxide ceramic material is Al2O3.

21. The container (1) as set forth in claim 20, wherein the weight proportion of Al2O3 in the matrix is greater than 70%.

22. The container (1) as set forth in claim 20, wherein Al2O3 is further comprising a zirconium oxide with the weight proportion of ZrO2 in the matrix being greater than 5%.

23. The container (1) as set forth in claim 20, wherein Al2O3 is further comprising a zirconium oxide dopant with the weight proportion of ZrO2 in the matrix being greater than 5%.

* * * * *